C. D. STEWART.
REGULATING APPARATUS FOR LIQUID FUEL BURNERS.
APPLICATION FILED FEB. 10, 1920.
1,400,636.
Patented Dec. 20, 1921.
2 SHEETS—SHEET 1.
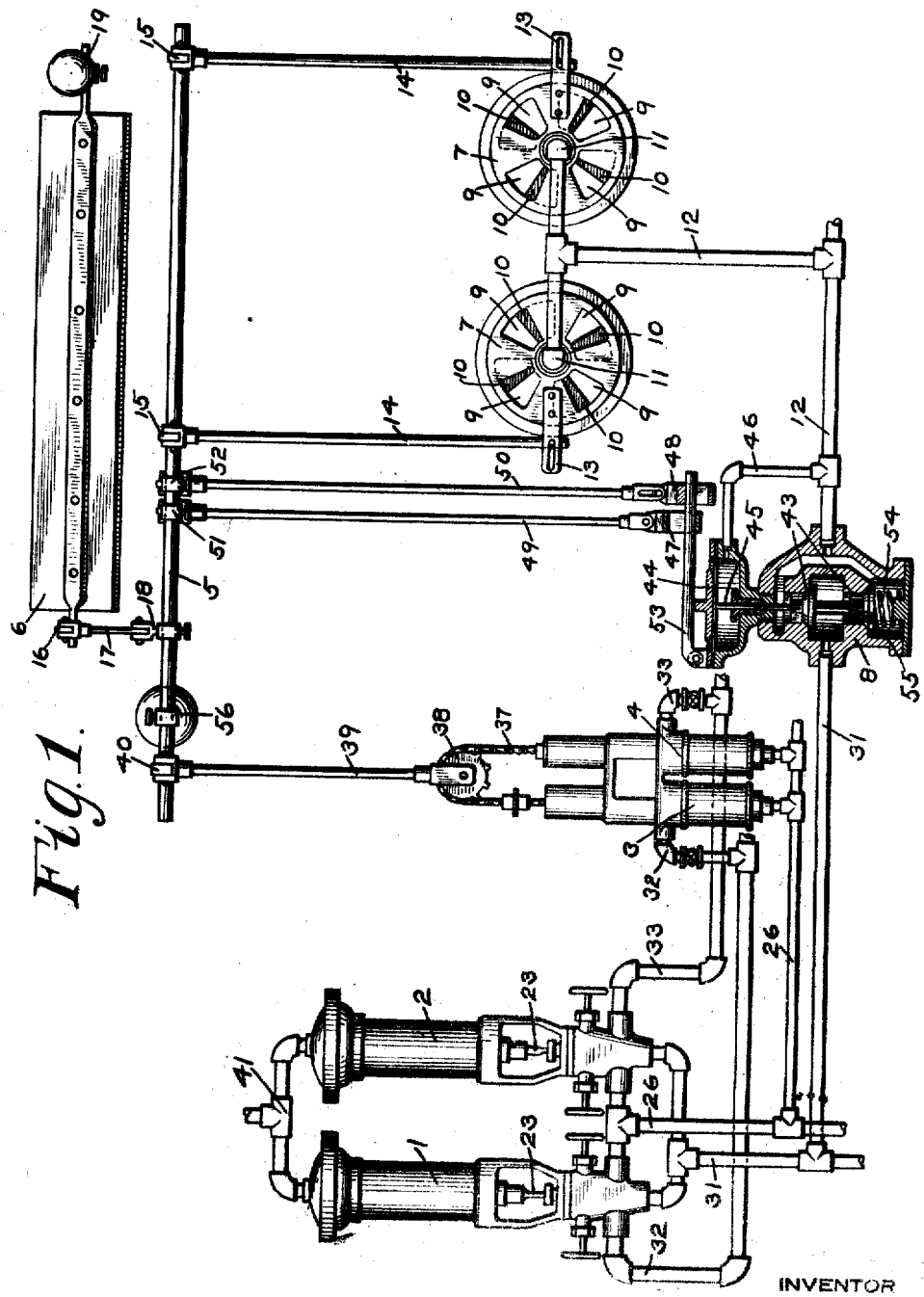
INVENTOR
CARLTON D. STEWART
BY
ATTORNEY

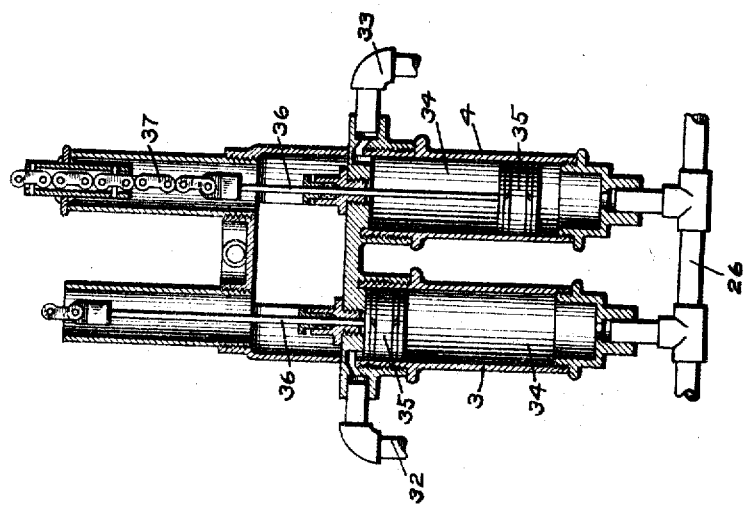
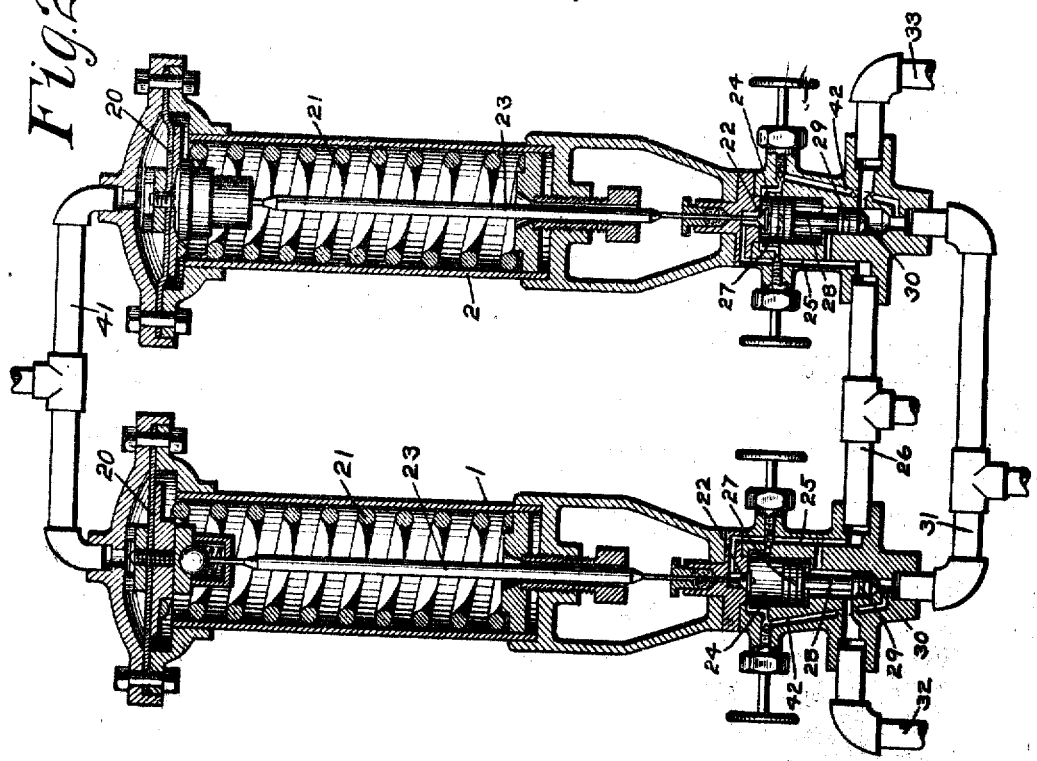

UNITED STATES PATENT OFFICE.

CARLTON D. STEWART, OF BERKELEY, CALIFORNIA, ASSIGNOR TO ASSOCIATED ENGINEERING AND SUPPLY COMPANY, OF SAN FRANCISCO, CALIFORNIA, A CORPORATION OF CALIFORNIA.

REGULATING APPARATUS FOR LIQUID-FUEL BURNERS.

1,400,636.     Specification of Letters Patent.     Patented Dec. 20, 1921.

Application filed February 10, 1920. Serial No. 357,632.

*To all whom it may concern:*

Be it known that I, CARLTON D. STEWART, a citizen of the United States, residing at Berkeley, in the county of Alameda and State of California, have invented new and useful Improvements in Regulating Apparatus for Liquid-Fuel Burners, of which the following is a specification.

This invention relates to liquid fuel burning apparatus, and more particularly to an automatic controlling mechanism therefor.

The principal object of my invention is to provide an improved automatic controlling mechanism for liquid fuel burning apparatus, in which the pressure of liquid fuel is varied by steps simultaneously with the adjustment of the draft, by the operation of said mechanism.

In the accompanying drawings; Figure 1 is a diagrammatic view of an automatic controlling mechanism for liquid fuel burning apparatus, embodying my invention; Fig. 2 a central sectional view of the master controller; and Fig. 3 a central sectional view of the liquid fuel and damper regulator.

As shown in Fig. 1 of the drawings, the apparatus may comprise a master controller, having controlling units 1 and 2 for controlling a fuel and damper regulator, having operating units 3 and 4.

The fuel and damper regulator units 3 and 4 are adapted to operate a shaft 5 through which a stack damper 6 and draft doors 7 are operated, and the load on a liquid fuel pressure regulator or reducing valve 8 is varied.

Each draft door 7 is provided with a plurality of openings 9 for controlling openings 10 through which air is supplied to the liquid fuel burners. A suitable liquid fuel burner is located at the central portion 11 of each draft door and is supplied with liquid fuel under pressure through pipe 12, leading from the pressure regulator 8.

An arm 13 is secured to each draft door 7 and is operatively connected to a rod 14 which is pivotally connected to an arm 15 secured to the shaft 5.

The stack damper 6 is operatively connected to shaft 5 through an arm 16, a rod 17 and an arm 18 secured to said shaft, and is provided with a counterweight arm 19, tending to turn the damper toward its open position.

Each unit of the master controller may comprise a casing, within which is mounted a diaphragm 20, subject on one side to the pressure of steam generated by the boiler, which is heated by the liquid fuel burners and on the opposite side to the pressure of a coil spring 21.

The diaphragm 20 is adapted to operate a valve 22 through a stem 23 and said valve controls the venting of liquid under pressure from a piston chamber 24 to a passage 25 which leads to an exhaust or return pipe 26.

A differential piston is provided, with the larger head 27 mounted in piston chamber 24 and connected by stem 28 to the smaller head 29.

The piston head 29 associated with the controller unit 1 is provided with a valve 30 for controlling communication from a liquid fuel supply pipe 31 to a pipe 32, while valve 30 associated with piston head 29 of the controller unit 2 controls communication from the supply pipe 31 to a pipe 33.

Each unit of the fuel and damper regulator may comprise a casing, having a piston chamber 34 containing a piston 35 and the pistons of the two units are connected by stems 36 to a sprocket chain 37, which passes over a sprocket wheel 38, pivotally mounted on the lower end of a rod 39, said rod being operatively connected to the shaft 5 by an arm 40 secured to said shaft.

The space below each piston 35 is connected to the exhaust or return pipe 36 and the space above each piston is connected respectively to the pipes 32 and 33.

The variable pressure fuel valve device 8 may comprise a body containing a double seating valve 43 for controlling communication from the liquid fuel supply pipe 31 to the pipe 12.

The valve 43 is connected to a diaphragm 44 by a stem 45 and said diaphragm is subject on one side to the pressure of liquid fuel in the pipe 12 as supplied through a pipe 46.

On the opposite side, the diaphragm 44 is adapted to be subjected to the load of weights 47 and 48 which are connected to the respective rods 49 and 50, said rods being operatively connected to the shaft 5 by means of arms 51 and 52.

The weights 47 and 48 are slotted and a lever 53, pivotally mounted on the body of the valve device, extends through said slots and bears on the diaphragm 44.

In operation, steam is supplied from the steam boiler through pipe 41 to the chamber above each diaphragm 20 of the master controller units 1 and 2 and liquid fuel under pressure is supplied by means of a suitable pump to the supply pipe 31.

The spring 21 of unit 1 may be adjusted to the maximum steam pressure which it is desired to carry in the boiler and the spring 23 of unit 2 may be adjusted to a steam pressure one or two pounds less than the maximum pressure.

When the steam pressure is low, the spring 21 acts on the diaphragm 20 to raise the stem 23 and hold the valve 22 closed and then liquid under pressure flows from pipe 31 through a restricted passage 42 to the piston chamber 24 and acts on the piston head 27 to force the differential piston downward, so that the valve 30 is seated, as shown in unit 1 of the master controller.

When the steam pressure increases to within one or two pounds of the maximum steam pressure, the pressure of the spring 21 of master controller unit 2 is overcome and the diaphragm 20 is moved by the steam pressure so as to operate the stem 23 and open the valve 22.

Liquid under pressure is then vented from piston chamber 24 through passage 25 faster than it can be supplied through the restricted passage 42, so that the pressure of liquid acting below the piston head 29 forces the differential piston upwardly, as shown in unit 2 of the master controller and liquid fuel under pressure is then supplied from pipe 31 to the pipe 33 and thence to the space above piston 35 of the fuel and damper regulator unit 4.

This piston is thereupon moved downwardly, as shown in Fig. 3, so that the rod 39 is pulled down by the movement of the chain 37 on the sprocket wheel 38.

The shaft 5 is thereby partially rotated, so as to move the stack damper 6 to partly cut off the stack draft.

The draft doors 7 are also rotated to partially close the openings 10, as shown in Fig. 1 and the weight 47 is lifted by the upward movement of the rod 49 so that the load of said weight is prevented from acting on the diaphragm 44.

This weight 47 being lifted, the oil pressure beneath the diaphragm 44, together with the pressure of spring 54 will tend to close the valve 43 a certain amount, and hence partially restrict the flow of oil to the pipe 12 and thus cut down the fires at the burners 11 a certain amount.

With the fires thus reduced and the corresponding dampers partially closed, should there be a further increase in steam boiler pressure, sufficient to overcome the pressure of the spring 21 of the master controller unit 1, then the diaphragm 20 of this unit will operate to open the corresponding valve 22, so as to vent liquid under pressure from the piston chamber 24.

The differential piston will then be operated, as in the case of the unit 2, so as to admit liquid under pressure through pipe 32 to the chamber above piston 35 of the fuel and damper regulator unit 3.

This piston is then moved downwardly and operates the rod 39 through the chain 37 and the pulley 38, so as to rotate the shaft 5 and cause a further closing of the stack damper 6 and the burner dampers 7.

The movement of the shaft 5 also causes the rod 50 to move upwardly and lift the weight 48, so that the load of this weight is removed from the arm 53 and the diaphragm 44.

This allows the valve 43 to fully close, so that no liquid fuel passes from the supply pipe 31 to the burner pipe 12, except a slight flow through a restricted port 55 in the valve 43.

While the maximum boiler pressure is maintained, the fires remain reduced and the dampers remain adjusted accordingly, but if the boiler pressure should reduce below the maximum pressure, the diaphragm 20 of the master controller unit 1 will be operated by its spring 21, so as to close the corresponding valve 22.

This permits equalization of liquid fuel pressures on the differential piston through the restricted port 42, so that the pressure acting on the larger area of piston head 27 will cause the downward movement of the differential piston and thereby close the valve 30.

Liquid fuel under pressure is then vented from the chamber above the piston 35 of the fuel and damper regulator unit 3, through pipe 32, the chamber intermediate the piston heads 27 and 29, and passage 25 to the exhaust or return pipe 26.

Piston 35 of unit 3 will then move upwardly, due to the action of the weighted arm 56 on the shaft 5 and the weighted arm 19, so that the stack damper 6 and the burner dampers 7 are caused to move toward their open positions.

The downward movement of the rod 50 causes the weight 48 to rest on the arm 53, so that the load of this weight is applied to the diaphragm 44. The valve 43 of the fuel pressure regulator is then opened a certain amount, to admit liquid fuel under pressure to the burner pipe 12 and thus increase the fires at the burners 11 a certain amount.

In a similar manner, should the boiler pressure further reduce, the diaphragm 20 of the master controller unit 2 will be operated to close the corresponding valve 22 and thus cause the differential piston of this unit to move to its lower position, in which the supply of liquid fuel to the chamber above the piston 35 of the fuel and the damper regulator unit 4 is cut off and said chamber is vented to the return pipe 26.

The shaft 5 is then rotated by the further upward movement of the rod 39, thereby effecting the further opening of the stack damper 6 and the burner dampers 7. The weight 47 is also moved downwardly by the rod 49, so that the load of this weight is applied to the arm 53 and the diaphragm 44 of the fuel pressure regulator.

This produces a wider opening of the valve 43 and increases the flow of liquid fuel to the burners 11.

It will be evident that in the operation of the apparatus, the opening of the dampers is positively assured, when fuel is admitted to the burners, and the dampers are also closed the desired amount when the fuel supply is reduced.

Any desired number of fuel valve and damper regulator units may be governed by the master controller, and, if desired, additional master controller units and additional fuel valve and damper regulator units may be employed, in order to provide an increased number of steps in the regulation.

Having now described my invention, what I claim as new and desire to secure by Letters Patent, is:

1. In a liquid fuel burning apparatus for a steam boiler, the combination with liquid fuel burners, of a pressure regulator for varying the pressure of liquid fuel supplied to the burners and a master controller governed by variations in steam boiler pressure for effecting the adjustment of said pressure regulator to thereby vary the pressure of liquid fuel supplied to the burners.

2. In a liquid fuel burning apparatus for a steam boiler, the combination with liquid fuel burners, of a pressure regulator for controlling the supply of liquid fuel to said burners and having a variable load means for adjusting said regulator to supply liquid fuel at different pressures and a master controller, and subject to fluctuations in pressure in the steam boiler for controlling the operation of said variable load means.

3. In a liquid fuel burning apparatus for a steam boiler, the combination with liquid fuel burners, of a pressure regulator for controlling the supply of liquid fuel to said burners and having a variable load means for adjusting said regulator to supply liquid fuel at different pressures, a piston controlled device for operating said variable load means, and a master controller, subject to variations in pressure in the steam boiler, for controlling the operation of said device.

4. In a liquid fuel burning apparatus for a steam boiler, the combination with liquid fuel burners, of a pressure regulator for controlling the supply of liquid fuel to said burners and comprising a valve, a diaphragm for operating said valve, and weights adapted to be successively applied to and removed from one side of said diaphragm, a mechanism having units including pistons for successively operating said weights, and a master controller having units subject to the steam pressure in the steam boiler for controlling the operation of said pistons.

5. In a liquid fuel burning apparatus for a steam boiler, the combination with liquid fuel burners, of dampers for regulating the draft at said burners, a pressure regulator for controlling the supply of liquid fuel to said burners and comprising a valve, a diaphragm for operating said valve, and weights adapted to be successively applied to and removed from one side of said diaphragm, a rotatable shaft operatively connected to said dampers and said weights, a mechanism for operating said shaft, and a master controller subject to the pressure in the steam boiler for controlling the operation of said mechanism.

6. In a liquid fuel burning apparatus for a steam boiler, the combination with liquid fuel burners, of means for regulating the draft, a pressure regulating valve device for varying the pressure of liquid fuel supplied to said burners, and means governed according to variations in pressure in the steam boiler for controlling the operation of said draft regulating means and the adjustment of said pressure regulating valve.

7. In a liquid fuel burning apparatus for a steam boiler, the combination with liquid fuel burners, of draft doors for controlling the draft to said burners, a rotatable shaft operatively connected to said doors for operating same, a valve device for regulating the pressure of liquid fuel supplied to said burners comprising a valve, a diaphragm for operating said valve, and an arm bearing on one side of said diaphragm, and weights operatively connected to said shaft and adapted to be applied as a load on said arm upon rotation of said shaft.

In testimony whereof I have hereunto set my hand.

CARLTON D. STEWART.